US008019577B2

(12) United States Patent
Labourdette (10) Patent No.: US 8,019,577 B2
(45) Date of Patent: Sep. 13, 2011

(54) METHOD, PROGRAM AND COMPUTER SYSTEM FOR PALEOCHANNEL MODELING

(75) Inventor: Richard Labourdette, Caubios-Loos (FR)

(73) Assignee: Total S.A., Courbevoie (FR)

( * ) Notice: Subject to any disclaimer, the term of this patent is extended or adjusted under 35 U.S.C. 154(b) by 517 days.

(21) Appl. No.: 11/942,058

(22) Filed: Nov. 19, 2007

(65) Prior Publication Data

US 2008/0126048 A1    May 29, 2008

(30) Foreign Application Priority Data

Nov. 23, 2006  (FR) ..................................... 06 10259

(51) Int. Cl.
*G06F 17/50* (2006.01)
*G01V 1/00* (2006.01)
(52) U.S. Cl. .................. 703/2; 703/6; 703/10; 204/454; 137/590
(58) Field of Classification Search ................ 703/2, 10, 703/7–9, 6; 345/679, 440, 619; 204/454; 137/590
See application file for complete search history.

(56) References Cited

U.S. PATENT DOCUMENTS

| 3,662,780 A * | 5/1972 | Marsh ............................ 137/590 |
| 5,657,223 A * | 8/1997 | Juszczak et al. ............... 705/400 |
| 7,336,078 B1 * | 2/2008 | Merewether et al. ......... 324/326 |

| 2003/0230489 A1 * | 12/2003 | Cummings et al. ........... 204/454 |
| 2005/0228623 A1 | 10/2005 | Leflon et al. |
| 2006/0235666 A1 * | 10/2006 | Assa et al. ....................... 703/10 |

FOREIGN PATENT DOCUMENTS

EP          1584951 A     10/2005

OTHER PUBLICATIONS

Preliminary Search Report issued by the French Patent Office, FR 0610259.
Viseur, S. Stochastic Boolean Simulation of Fluvial Deposits: A New Approach Combining Accuracy with Efficiency. 1999 SPE Annual Technical Conference and Exhibition. 1999. SPE 56688. Society of Petroleum Engineers. pp. 1-8. XP-002446402.
Hauge, R et al. Object Models With Vector Steering. Mathematical Geology. 2006. vol. 38. No. 1. pp. 17-32. XP-01943182.
Viseur, S et al. New Fast, Stochastic, Boolean Simulation of Fluvial Deposits. 1998 SPE Annual Technical Conference and Exhibition. 1998. SPE 49281. Society of Petroleum Engineers. pp. 697-709. XP-002306772.
Holden, L et al. Modeling of Fluvial Reservoirs with Object Models. Mathematical Geology. 1998. vol. 30. No. 5. pp. 473-496. XP-002444547.

* cited by examiner

*Primary Examiner* — Thai Phan
(74) *Attorney, Agent, or Firm* — Lesley S. Craig (57) ABSTRACT

A method for modeling turbidite channels which may contain oil that it is desired to extract is provided in which the final shape of the complex resulting from migration of elementary channels over the course of deposition and which is observable from seismic data is combined with the implementation of simple geometric rules, comprising simulation of one or several intermediate channels passing through points on trajectories running from a final channel to an initial channel. The trajectories involved are different from the channel axes or lines; they reflect channel migration over time.

16 Claims, 12 Drawing Sheets

- ● CHARACTERISTIC POINTS
- ⎯⎯ TANGENTS TO POINTS OF ZERO CURVATURE
- ⎯⎯ EDGES OF TURBIDITIC COMPLEX
- ⎯⎯ MEDIAN CURVE BETWEEN EDGES OF TURBIDITIC COMPLEX
- ⎯⎯ CONTROL POINT PROJECTION PERPENDICULARLY ON MEDIAN CURVE

CHARACTERISTIC POINTS

TRAJECTORY OF POINTS

USER-SELECTED STATES

RANDOM COMPONENT OF POINT POSITIONING

FIG.8

Anciens=Old
Récents=Recent
Chenaux=Channels

Anciens=Old
Récents=Recent
Chenaux=Channels

- ● POSITIVE CURVATURE CHARACTERISTIC POINTS
- ○ NEGATIVE CURVATURE CHARACTERISTIC POINTS
- —— EDGES OF TURBIDITIC COMPLEX
- ―― LAST CHANNEL RECONSTRUCTED FROM SORTED POINTS

Anciens=Old
Récents=Recent
Chenaux=Channels

Anciens=Old
Récents=Recent
Chenaux=Channels

METHOD, PROGRAM AND COMPUTER SYSTEM FOR PALEOCHANNEL MODELING

BACKGROUND OF THE INVENTION

The present invention relates to computer-aided modeling of geological channels.

Methods are known, notably in oil exploration, for determining the position of oil-bearing reservoirs from the results of geophysical measurements performed at the surface or within drillings. One of the most useful prospecting methods employed in this area is probably seismology which makes it possible to visualize deep geological structures by analyzing seismic wave echoes. These seismic waves can be of natural origin (for example an earthquake) or of artificial origin, created for example by means of explosives, a vibrating truck, etc.). The seismic reflection is distinguished from seismic refraction. The seismic reflection is employed to determine interfaces between geological strata.

Among known geological structures, so-called channels (or paleochannels) are of particular interest in oil exploration. A channel is for example defined as a water conduit originating from the continent, carrying sand or sediment, which follows a variable winding course along a marine slope. When a marine flow path gets formed, this creates a channel which gradually gets filled up by sediments carried along by the fluid. Such sediments are called turbidites. Then, when flow starts again after a prolonged break or when there is some abrupt variation in flow rate for example, a new channel gets formed which is shifted to a greater or lesser degree with respect to the former channel. This is called channel migration. A succession of such sequences leads to the formation of a channel complex or fairway.

More precisely, the channel complex represents a conduit for transit of sediment, running from the continental shelf towards deep water. It exhibits a character which is frequently erosive and develops on the continental slope. It is made up of an amalgam of individual turbidite channels representing different sediment transport phases and events.

Channel complexes (or channel fairways) have a characteristic geometric shape with stacking of the channels making them up. Further, the sediment filling of the channel complexes is different from that of its environment. The channel complex thus has a relatively precise envelope, and it is possible to locate its margin. The margins of the channel complex can then be determined from an isopach map produced between two seismic horizons defining the base of the channel complex or fairway and the top of the complex filling.

Channel complexes and more precisely the channels themselves are potential oil bearing reservoirs; they possess the major characteristics such as high porosity or high permeability. Such channels are thus likely to contain oil that it is desired to extract; it is consequently useful to model their formation. Their sinuous geometry nevertheless makes them difficult to model.

In the modeling of subsoil properties, one can generally distinguish two families of methods: pixel-based methods where the property is calculated at each node (pixel) of a discrete model (a structured grid), and object-based methods—also called Boolean methods—in which geological objects (channels, lobes, dunes, etc.) are constructed and then employed to estimate values of the property in the reservoir model.

Pixel-based methods are not particularly suitable for channel modeling as they do not make it possible to reproduce the curvilinear and continuous shape of the deposit, for example fluvial depositions.

A very large number of object-based methods exist including two families between which a distinction is made: deterministic methods and probabilistic methods. The results that are obtained have many similarities, even though the methodological approaches used are completely different.

In deterministic methods, one sets out to reproduce the evolution of the channel in time and in space. These methods are based on geological and sedimentalogical concepts along with data from seismic visualization. Deterministic methods give very realistic results but can only be performed in the case where the objects are observable on seismic datasets.

In the case of probabilistic methods, each geological object is defined as a more or less complex geometrical shape. Typically, the channels are defined starting from a sinuous curve the distance from the channel axis of which is modeled using a stochastic process. This simulated curve is employed as a channel curve. Channel cross section is then calculated at every point on this curve, with generally variable thickness and width. The results that are obtained are much less realistic than with the deterministic methods. In order to overcome this problem, there have been proposals to deform the curve obtained using its geometry and a law which complies with the erosion at the convex edge of the channel. The results obtained are then more realistic and sinuous than the previous results.

Boolean methods of the probabilistic type do notably suffer from the defect of not allowing account to be taken of major sinuosities, thereby giving rise to poorly realistic geological models.

European patent application EP-A-1,584,951 provides improvements to the state of the art by providing prior parameterization of a reference geological horizon H, with a view to stochastically generating the associated paleo-channels or paleo geological structures in the region of this geological reference horizon.

Nevertheless, the known channel modeling methods do not make it possible to obtain simply a "realistic" continuity between channels, notably in regions of lateral migration. This results in the trajectories of development drillings made on the basis of such models failing to be optimal.

SUMMARY OF THE INVENTION

The invention consequently sets out to provide an automated modeling method making it possible to obtain, in a simple manner, better realism as regards channel stacking/continuity and as a result, lead to improvements in trajectories of development drillings.

This aim is achieved in a method for channel modeling, implemented by computer, comprising the steps of: interpreting characteristic data for a last channel and for a modeled initial channel; determining, from this interpreted data, points on trajectories running from the last channel to the initial channel; and simulating at least one intermediate channel running through these points.

Preferably, the interpreted data is characteristic for respective axes of last and initial channels, and at the step of determination of the points, the points are determined on trajectories running from the axis of the last channel to the axis of the initial channel.

Preferably, at the determination step, at least one of the trajectories depends on a distance between a point on the axis of the last channel and a point on the axis of the initial channel.

Preferably, the point on the last channel axis is a point characteristic of a B-spline type curve fitted to the axis of the last channel; and the point of the initial channel axis is a projection of this characteristic point onto the initial channel axis, for example a perpendicular projection.

Preferably, at the determination step, at least one of the trajectories is a line joining the last channel axis and the initial channel axis, a curvature of which depends on said distance between the point on the last channel axis and the point on the initial channel axis.

Preferably, the trajectory is a semi-parabola of amplitude varying depending on said distance between the point on the last channel axis and the point on the initial channel axis.

Preferably, the trajectory is a straight line if the distance between the point on the last channel axis and the point on the initial channel axis is greater than a critical distance; otherwise, the trajectory is a semi-parabola of amplitude varying depending on a distance between the point on the last channel axis and the point on the initial channel axis.

Preferably, the critical distance is a distance calculated as a function of the interpreted data.

Preferably, the critical distance is able to be user-modified.

Preferably, the method further comprises, prior to the step of interpretation of data, the steps of: reading data pertaining to a channel complex; and calculating data characterizing the initial channel and/or the last channel from said data pertaining to the channel complex.

Preferably, the data pertaining to the channel complex characterizes the margins of said complex, and in which, at the step of calculating data characterizing the initial channel and/or the last channel, the initial channel axis and/or the last channel is determined as a function of the margins of said complex.

Preferably, the data calculated characterizes the initial channel and in which, at the step of calculating said data, the initial channel axis is the median line of the margins of said complex.

Preferably, the data calculated characterizes the last channel, and, at the step of calculating this data, the last channel axis is determined as a function of the curvature of the margins of said complex, at points characteristic of each one of said margins, and as a function of the curvature sign of the points characteristic of each one of these margins.

The invention also provides a computer program product, the program comprising routines for executing the steps of the above method when the program is run in a computer.

The invention also provides a computer system comprising a memory storing a program comprising routines for executing the steps of the above method when said program is run.

Further characteristics and advantages of the invention will become more clear from reading the detailed description which follows of some embodiments of the invention provided solely by way of example, with reference to the attached drawings.

BRIEF DESCRIPTION OF THE DRAWINGS

FIGS. 7A-7B illustrate determination of point trajectories as a function of a critical distance in the cases where: (FIG. 7A) the critical distance is less than the projection distance, and (FIG. 7B) the critical distance is greater than the projection.

DETAILED DESCRIPTION OF PREFERRED EMBODIMENTS

The idea of developing a method for modeling turbidite channels by implementing simple geometric rules arose from the observation that present day modeling modules of the geostatistic object type do not make it possible to re-transcribe in a coherent fashion the arrangement of the channels within a channel complex.

Indeed, observations done both on terrain analogs and on high-resolution seismic datasets show a specific organization of the channels within channel complexes. This arrangement plays an overriding role in reservoir geometry, but also in how heterogeneity present in turbidite reservoirs is distributed.

The approach chosen in this invention, of the geometrical type, arose indirectly from observation of the arrangement of the elementary channels making up these channel complexes.

This approach is based on the principle that the final shape of the channel complex is the result of migration of elementary channels over the course of deposition. By combining:

the final shape of the complex which is, in the majority of cases, observable from seismic data;

if appropriate, the possible position of some of the elementary channels making it up, and rules for evolution of the system (on which the trajectories are based), the inventor realized that it was possible to define a realistic reservoir architecture compatible with observations.

Figure 1:
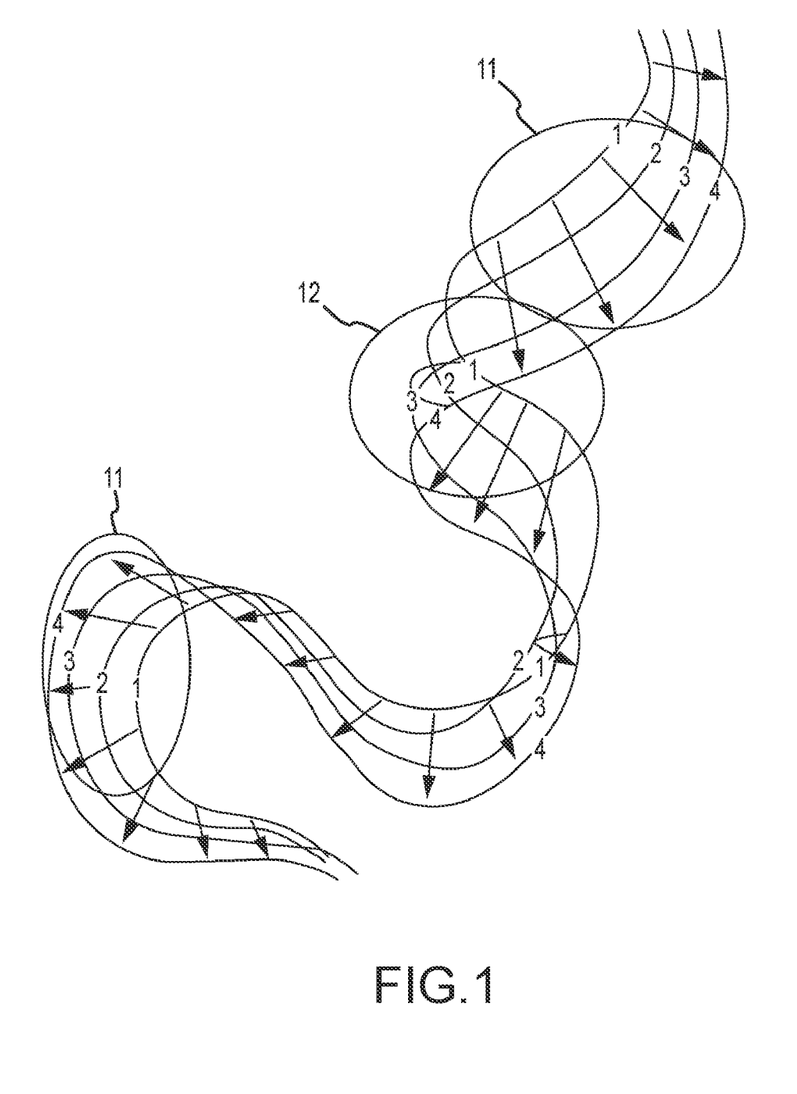
FIG. 1 is an interpretation of a seismic amplitude map in a channel complex showing lateral migration.

FIG. 1 shows interpretation of a seismic amplitude map in a channel complex showing lateral migration. Referring now to this figure and for the purposes of understanding the invention, we shall now describe briefly how lateral migration operates in a turbidite context.

Lateral migration constituting turbidite reservoirs occurs by a succession of phases of erosion and partial filling of an elementary channel migrating with the passage of time. Such migration occurs perpendicularly to the direction of flow, as well as longitudinally. The result is an arrangement called LOSC (Laterally Offset Stacked Channels), showing an evolution in the morphology of the individual channels 1, 2, 3, 4 over time, in the form of a greater or lesser accentuated degree of sinuosity, to yield a final shape enveloping the channel complex (FIG. 1).

In the organization shown in FIG. 1, 2 distinct patterns 11 and 12 can be seen, and these will have different influences on the dynamic behavior of the reservoir:

the first pattern 11 is the classical shape for natural migration, which can be qualified as being in stages, highly sinusoidal, and which makes it possible to create meander loops sweeping the whole complex.

the second pattern 12 represents abrupt changes in channel position over time or aggradation; these are regions of avulsion. Here, the channels overlap vertically forming a complex pattern in which the channels are mingled together and erode into each other at multiple points.

These two patterns 11 and 12 exhibit differing rates of heterogeneity preservation.

Figure 2:
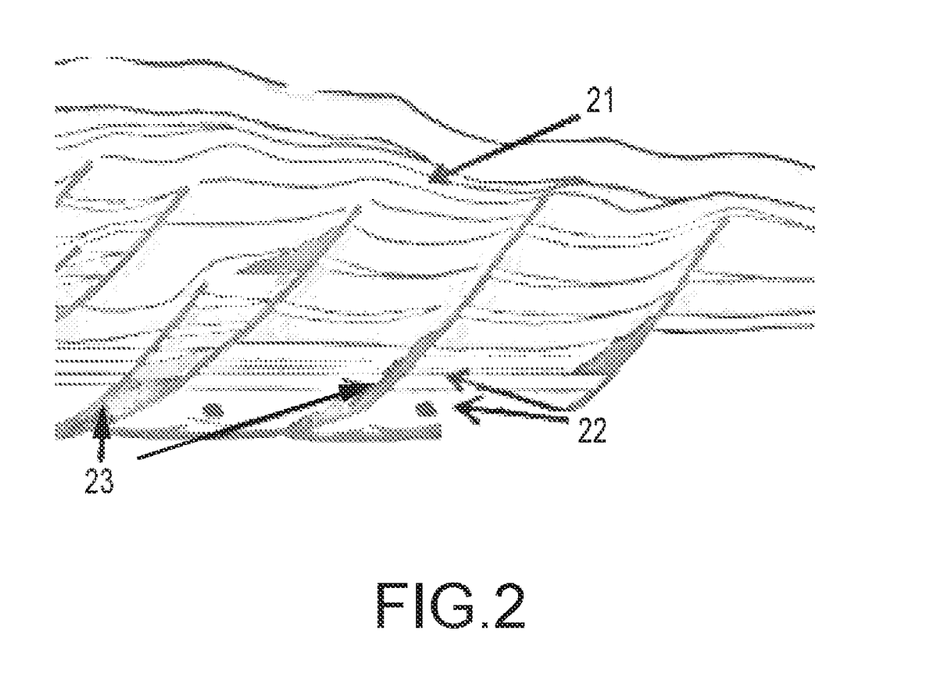
FIG. 2 is an interpretation in terms of reservoir facies of a seismic line in a channel complex showing lateral migration.

In the first case, (the region of lateral migration, pattern 11 in FIG. 1), with the impermeable barriers associated with the images of the channels show a high degree of preservation which in certain cases can fully disassociate the meander loops, on the same occasion entrapping hydrocarbons. This case is illustrated in FIG. 2, which shows an interpretation in reservoir facies terms of a seismic line in a channel complex exhibiting lateral migration. On FIG. 2, reference numerals 21, 22 and 23 respectively signify distal clays 21 (non-reservoir), sands of channels 22 (reservoir) and impermeable barriers 23.

Figure 3:
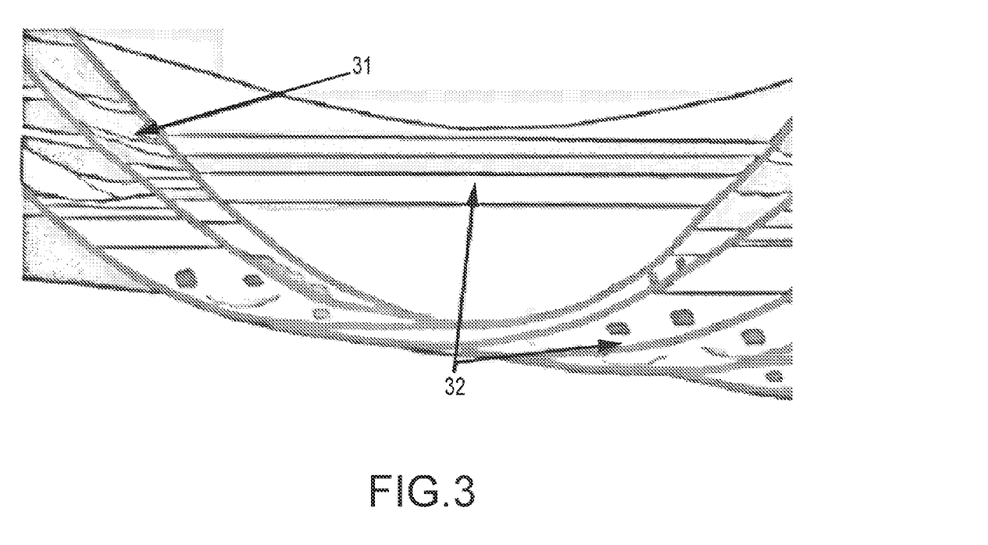
FIG. 3 is an interpretation in terms of reservoir facies of a seismic line in a channel complex exhibiting an avulsion.

The second case (avulsion, pattern 12 in FIG. 1) is illustrated on FIG. 3, showing an interpretation in terms of reservoir facies of a seismic line in a channel complex with avulsion. Reference numerals 31 and 32 respectively signify distal clays 31 (non-reservoir) and sands of channels 32 (reservoir). Here, there has been much less preservation of impermeable barriers; field dynamic behavior is consequently very different from the first case.

It will now be understood that the distribution of these patterns inside the turbidite reservoir can play a crucial role in learning about the channel in order to plan development of an associated oilfield. Quality modeling is needed, especially in regions of lateral migration.

Figure 4A:
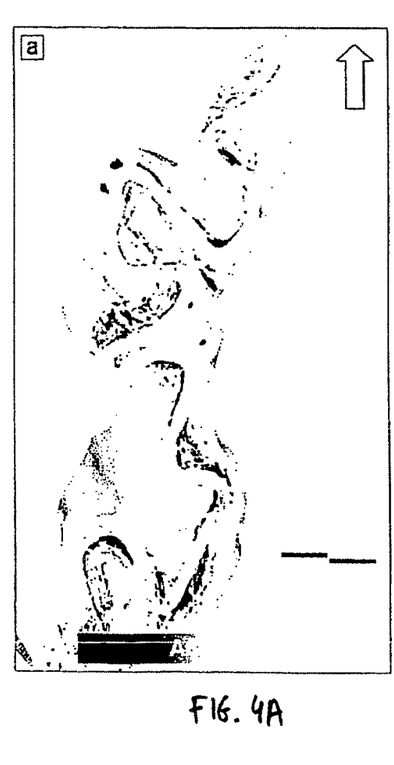
FIGS. 4A to 4C show a seismic amplitude map (FIG. 4A) and its interpretation as elementary channels (FIG. 4B), FIG. 4C showing the result of a "conventional" geostatistic simulation of the channels in FIG. 4B.
Figure 4B:
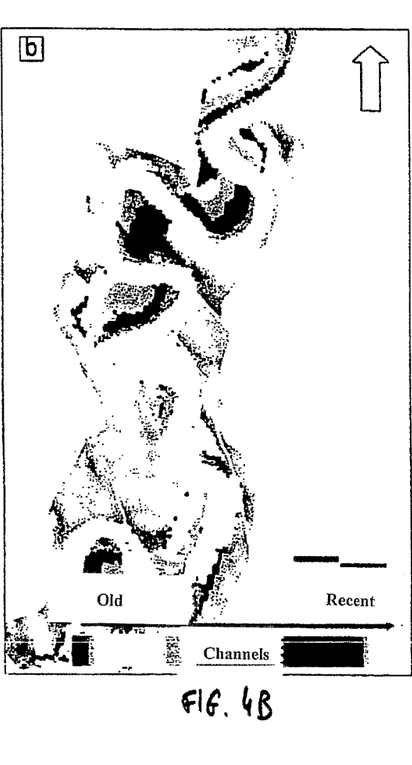
Figure 4C:
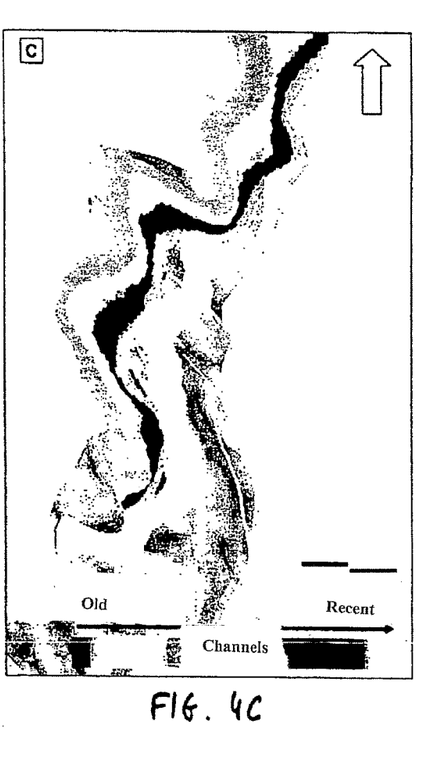

FIGS. 4A-4C show a map of seismic amplitude (FIG. 4A) and its interpretation in terms of elementary channels (FIG. 4B); FIG. 4C shows the results of a "classical" geo-statistical simulation of the channels in FIG. 4B.

Referring now to these figures, the method of the invention is based on geometrical laws arising out of phenomenon observations on high resolution seismic data. The seismic dataset provides an image of exceptional quality of the lateral migration phenomenon (corresponding to FIG. 4A). It should be noted that in order to comply with the criteria for printing patent documents, the images in FIGS. 4A-4C have been slightly reworked and certain details are consequently less visible than in the original color images.

When we compare FIGS. 4A and 4C we see that the "classical" Boolean or geo-statistical simulation of FIG. 4C does not correctly represent the organization of the individual channels, when compared to the interpretation given in FIG. 4B.

The invention provides a solution to this problem through simulation of one or several intermediate channels passing through points on trajectories running from a final channel to an initial channel. The trajectories involved are different from the channel axes or lines; they reflect channel migration over time. The use of such trajectories ensures a certain degree of coherence of arrangement of the channels modeled within a channel complex. The fact of starting out from the last channel to end up at the initial channel proves to be a judicious choice considering that information concerning a last channel is the most frequently observable, or even quantifiable, from a seismic dataset. The trajectories discussed here are consequently reversed with respect to the channel migration trajectories over time. Consequently, the fact of simulating an intermediate channel passing through points on these trajectories makes it possible to obtain greater realism as regards channel stacking/continuity.

Before going ahead to discuss details of the implementation of the invention, we should mention two separate cases of construction, which can be envisaged in the framework of the invention:

in the first case, the last channel in the migration, marking the termination of sedimentation, is filled with clay, thereby allowing direct (complete or partial) observation on seismic images, even of medium definition (the contrast in impedance between sands of the other channels and the clay of the last channel making observation possible). The method of the invention makes it possible, in one embodiment, to perform modeling more specifically adapted to this first case.

in the second case, the last channel is not filled with clay (the drop in deposition of sedimentary material was not sufficient), meaning it is not distinctly observable. It can nevertheless be reconstituted according to this invention, using the morphology of the complex itself. The invention makes it possible, in another embodiment, to more specifically model this second case.

The two embodiments will be discussed below.

Whatever the case may be, it will be supposed that digital data characteristic of a complex and, if appropriate, of the last channel (first case above) is available. This dataset will make it possible to model an initial channel and, if appropriate, the last channel (the second of the cases above). There will consequently be available in all cases, at a given stage in running of the algorithm at the basis of the invention, characteristic data for a last channel (if appropriate, modeled) and for a modeled initial channel, which in their turn will allow the desired channel modeling.

Below we shall describe the embodiment of the invention which is more particularly destined for the first case above with reference to FIG. 5. This figure shows a B-spline type curve modeling the centerline of the last channel; it additionally shows an extraction of characteristic points for this curve.

The last channel, which is visible or partially visible, can serve as a basis for the geometrical construction of the other channels. We are thus in a context where characteristic data for the last channel is available.

The idea developed in the invention is to go backwards in time, moving towards the morphology of the initial channel, taking as a basis for example the overall complex morphology. We are thus in the context where characteristic data for the complex is available which will allow an initial channel to be modeled. In other words, the characteristic data for the complex will allow characteristic data for the modeled initial channel to be obtained.

We consider that channel morphology then "evolves" between the final state and the initial state in a coherent fashion and in accordance with a number of finite states, if necessary set or imposed by the user. These states reflect in reality the number of separate channels. The number of states consequently makes it possible to set the number of intermediate channels that it is desired to simulate. This number is typically able to be deduced from experience. Alternatively, it may be contained in or able to be deduced from the dataset interpreted according to the method, for the purposes of modeling.

The approach can then for example consist in applying a parametered curve 50 to the axis (in other words the centerline) of the last channel determined from the seismic data. This makes it possible to characterize the axis 50 of this channel. By the term "axis" we mean an ideal (curved) line with respect to which the characteristic elements of a channel are arranged with a certain equilibrium. The axis, once characterized, can then act as a support for the trajectories from which the intermediate channels are modeled.

Below, we shall consider that the parametered curve is a B-spline. Nevertheless, other types of representation, such as a polynomial representation or a NURBS (non-uniform rational B-spline) representation, can be envisaged.

Figure 5:
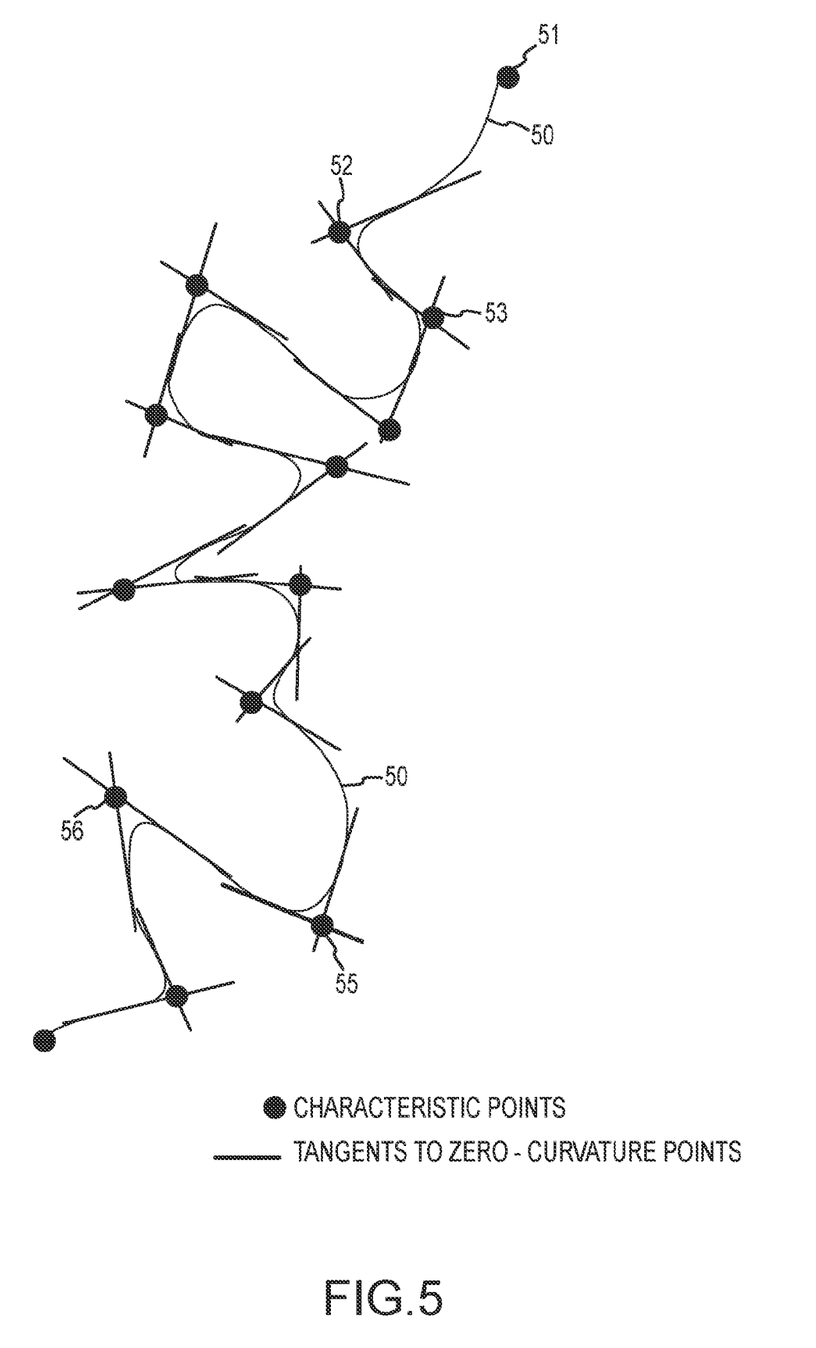
FIG. 5 shows a B-spline type curve on the last channel centerline with extraction of the characteristic points on this curve.

From this curve 50 we extract the last channel axis characteristic points 51, 52, 53, 55, 56 (cf FIG. 5). In practice, these points are control points for the curve. Curve 50, although it does correspond to a final state, is the starting point for the procedure employed in the invention. Further, although below we shall talk about last and initial channels, it should be understood that a last channel is an elementary channel that has migrated over the passage of time with respect to a particular initial channel. A last channel consequently corresponds to a state that his subsequent to the initial state.

Figure 6:
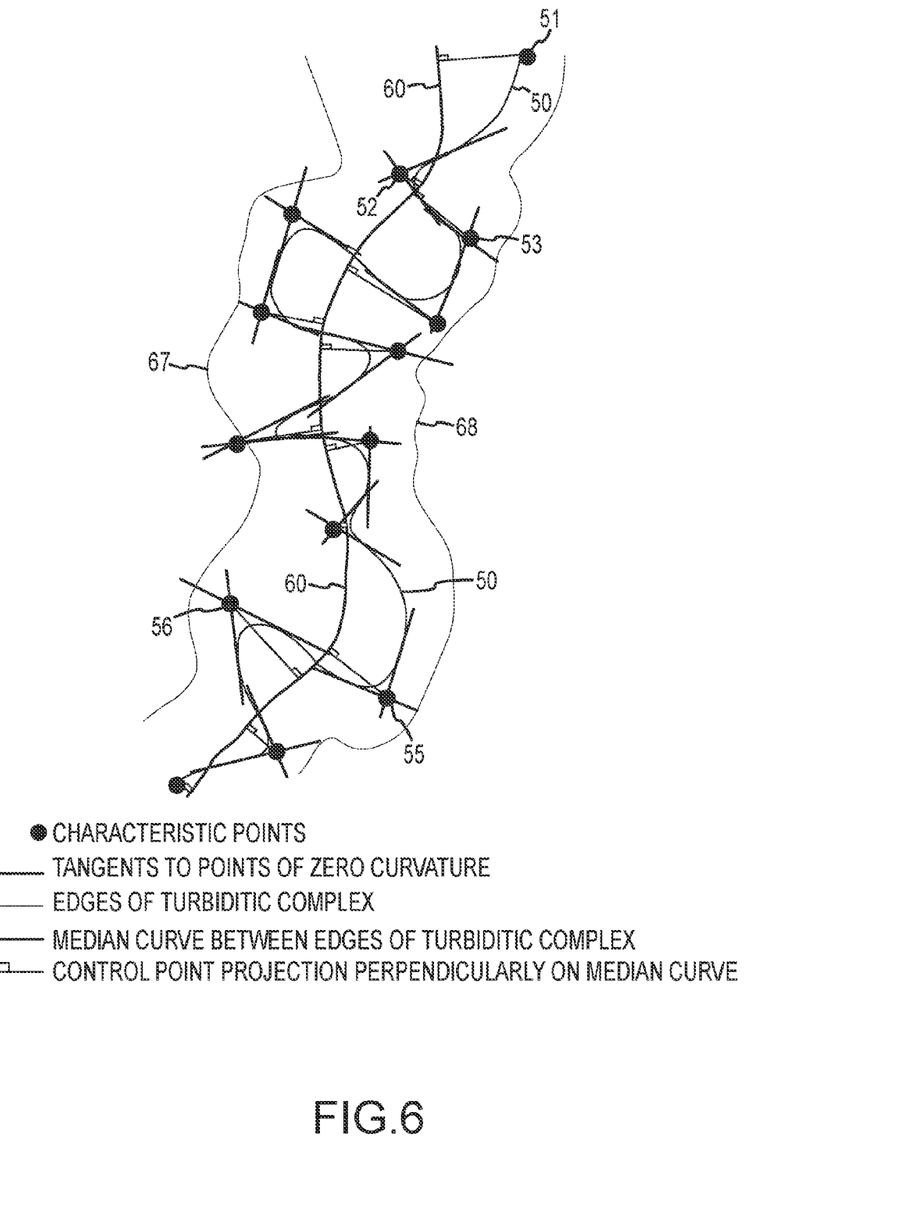
FIG. 6 shows the creation of a centerline for a channel complex and the perpendicular projection of characteristic points on the last channel onto this centerline.

The point of arrival (in other words corresponding to the initial state or initial channel) is for example determined as a function of morphology, typically the margins or edges of the complex. This is illustrated in FIG. 6. To do this, a median curve 60 is extracted from the two edges 67, 68 of the channel complex, for which characteristic data is available. This can be generalized without difficulty to three-dimensional data for the complex.

The median curve 60 is for example treated in the same way as curve 50, by example by applying a B-spline type curve 60. We now have data that is characteristic for the axis 60 of the modeled initial channel, originating from morphology of the complex. This will make it possible to determine points on the trajectories running from the last channel to the initial channel, and more precisely from last channel axis 50 to initial channel axis 60.

Other types of data characteristic for the axis of the initial channel may nevertheless be envisaged, by for example incorporating elements originating from interpretation of a seismic image.

In order to guarantee that the trajectories are coherent with the channels, the trajectories are preferably modeled as being dependent upon a distance between a point 52, 53, 55, 56 for last channel axis 50 and a point for initial channel axis 60. The trajectories are thus readily parametered as a function of the channel axes, which are representative of the geometry of the last and initial channels. The trajectories obtained are consequently coherent with complex morphology.

In this respect, the characteristic points 52, 53, 55, 56 of last channel line 50 (in other words the B-spline control points) can for example be projected onto the median curve 60 determined previously (as illustrated in FIG. 6). Projection is typically a perpendicular projection. We now have available a set of characteristic distances between points on the last channel axis 50 and points on initial channel axis 60. These distances (which are then called projection distances) allow the trajectories to be parametered.

Figure 7A:
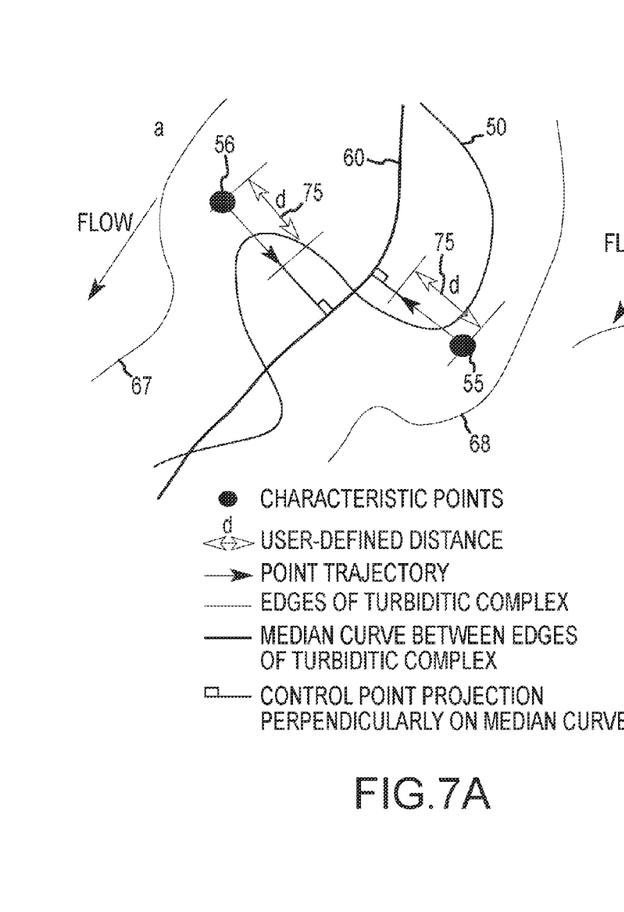
Figure 7B:
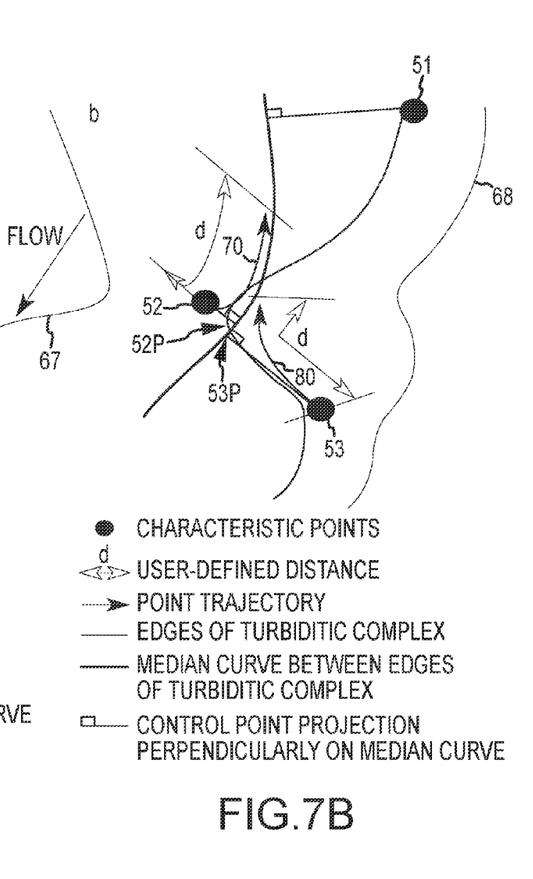

FIGS. 7A-7B illustrate trajectory determination as a function of a critical distance.

Referring now to these figures, trajectories are preferably modeled as lines joining final channel axis 50 and initial channel axis 60, the curvature of this line depending on the previously determined projection distances.

By the "curvature" of a trajectory, we understand a quantitative measurement of the greater or lesser degree of curvature of this trajectory. Curvature can be zero (FIG. 7A) in which case a straight line segments is obtained, or locally non-zero (FIG. 7B) in which case a locally curved curvature is obtained.

In more detail, the movement initiated on the characteristic points is for example done following a semi-parabola 70, 80 (FIG. 7B) the focus of which is calculated with respect to an origin 52, 53 on the last channel axis and of which the orientation and directrix are defined by projection 52$p$, 53$p$ of the origin onto median curve 60, in other words the modeled initial channel axis (FIG. 7B). The amplitude of the parabola is thus directly linked to channel complex morphology. This contributes to improving realism of the modeled channels.

Alternatively, another type of curve (for example a segment of a Gaussian curve) can be envisaged.

Alternatively again, the type of curve employed varies as a function of projection distance. For example, a length or critical distance 75 (reference symbol "d" in FIG. 7) can act to manage the type of curve that will be used. This length is for example determined by the user or is calculated in line with morphology of the complex, using a given model. As illustrated on FIG. 7, if projection distance is greater than critical distance d, then the trajectory of the point is a straight line. Otherwise, as FIG. 7B shows, if the projection distance is less than critical distance d, then the trajectory the control point will follow a semi-parabola the amplitude of which is proportional to this distance plotted along the projection straight line, then along the axis of the initial channel in the opposite direction to the flow direction (FIG. 7B).

Figure 8:
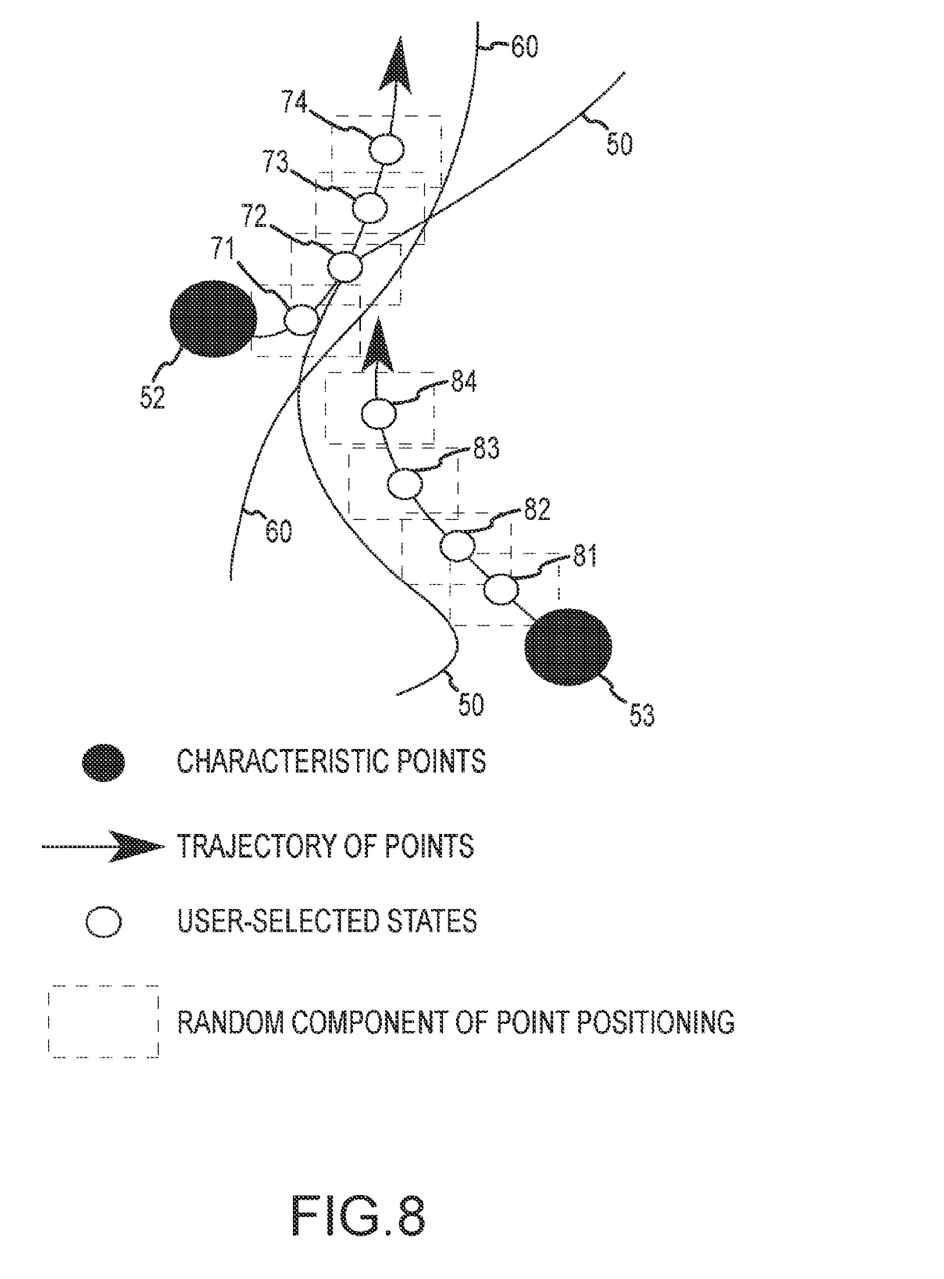
FIG. 8 shows the definition of the points on the point trajectories for the modeling of intermediate channels passing through these points.

As FIG. 8 shows, the number of states (which optionally can be parameterized by the user) is then used to extract points 71-74, 81-84 of these trajectories 70, 80, in order to subsequently associate them with respective channels. For greater realism in the subsequent modeling, a random point positioning component can be introduced through an area of uncertainty (also optionally able to be user-parametered). The centers of the areas of uncertainty can however be regularly distributed along trajectories. The uncertainty areas can optionally overlap partially, as FIG. 8 shows.

Regarding intermediate channel modeling, the median lines of intermediate channels are created by associating points 71-74, 81-84 obtained in correspondence with each state (here, four states 1-4 are shown). Typically, a B-spline fitted to the points corresponding to one state can be used, for each one of the states. Final intermediate channel morphology is then obtained by applying a morphology centered on each of the intermediate channel axes.

As can be seen by comparing the maps for channels 91A, 92A interpreted starting from seismic data (FIG. 9A, corresponding to FIG. 4B) and the channels 91B, 92B simulated using the present embodiment (FIG. 9B), the arrangement of the intermediate channels obtained 92B is particularly realistic. A comparison with FIG. 4C (geostatistic or Boolean modeling) further shows that implementing the method according to the invention distinctly improves channel realism. In particular, the channels simulated according to the invention show more realistic lateral stacking.

Figure 9A:
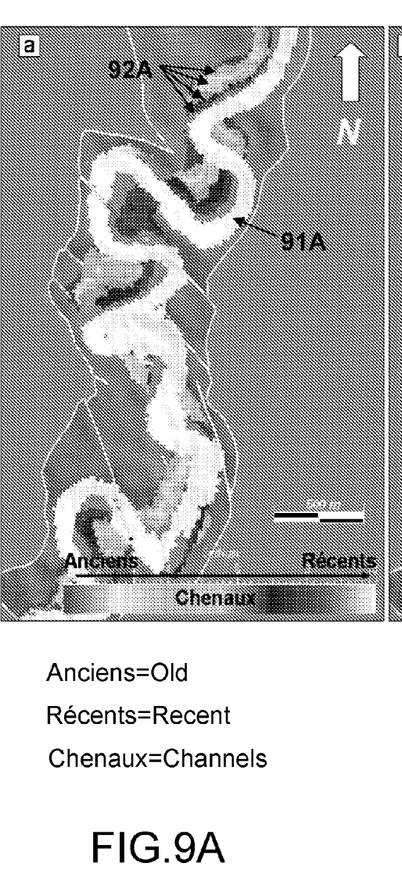
FIGS. 9A-9B allows comparison of maps obtained from interpreting channels from seismic data (FIG. 9A) and channels modeled using an embodiment of the invention (FIG. 9B).
Figure 9B:
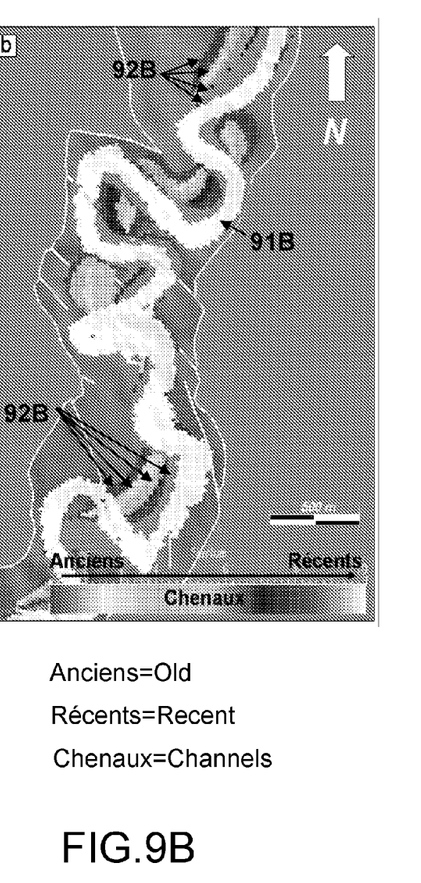

It should be noted that last channels 91A and 91B are here identical, in view of the particular situation we have chosen. In effect, data for last channel 91 originating from the interpretation of FIG. 9A are typically employed as input data for the modeling of FIG. 9B.

We shall now describe an embodiment implementation of which is more specifically suited to the second case briefly mentioned above, in order to simulate lateral migration when data for a last channel is not available.

In this case, it is not possible to immediately distinguish the last channel. The procedure used in the first embodiment consequently needs to be slightly modified: the last state must additionally be modeled, in order to obtain characteristic data for the last channel. Once this data is available, the algorithm can run as in the first embodiment described above.

Last channel modeling is in the present case also based on channel complex morphology. This has proved suitable provided this morphology contains locally the information needed for reconstituting a last channel (notably in the loops of the meanders).

The methodology adopted for creating the last channel consequently draws inspiration from the previous methodology. This methodology is described with reference to FIG. 10, which shows the last channel being reconstituted from characteristic points for each one of the margins of the complex.

Figure 10:
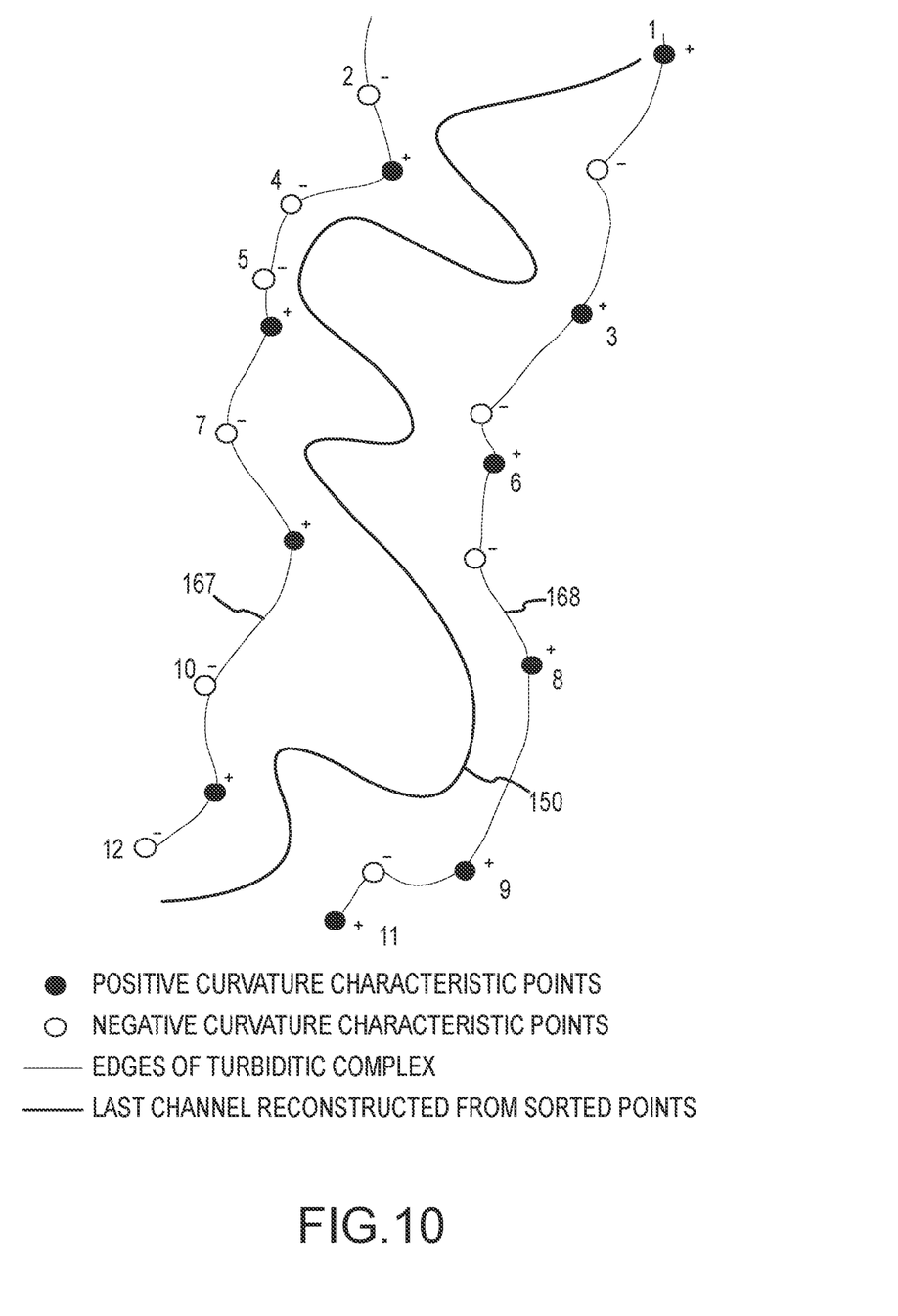
FIG. 10 shows reconstruction of the last channel using the characteristic points for the margins of the channel complex according to a further embodiment of the invention.

B-spline curves are for example applied to each of the margins 167, 168 of the complex, allowing characteristic points to be extracted therefrom together with a sign for the curvature of each margin. For example, the points numbered 1, 3, 6, 8, 9, 11 are positive curvature (in the geometrical sense) points on the margin 167. The points numbered 2, 4, 5, 7, 10, 12 are points of negative curvature of margin 168.

Last channel axis 150 is for example determined as a function of curvature and curvature sign at characteristic points on the margins 167, 168.

In more detail, the user can optionally designate a first control point, on one of the margins of the complex. Alternatively, this control point is determined automatically, for example depending on the order of appearance (in the case considered, this is the point numbered 1, at the most northerly point of the complex). Then, all the control points 1, 3, 6, 8, 9, 11 having the same curvature sign are extracted, together with the oppositely-signed control points 2, 4, 5, 7, 10, 12 on the opposite margin of the complex. A sort operations on curvature sign associated with the characteristic points on each of the complex margins is thus operated. Those curvature points which are adopted "jump" from one margin to the other, changing sign. These points are then assembled into their respective order of appearance to allow a final artificial last channel 150 to be created by applying a B-spline. The sort performed thus makes it possible to determine simply successive inflections of curve 150 modeling the axis of the last channel, relying on morphology of the initial complex.

Figure 11A:
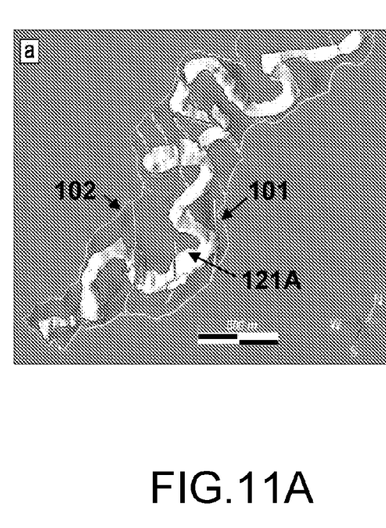
FIGS. 11A-11B allow comparison of the last channel originating from seismic data (FIG. 11A) and the last channel modeled from the morphology of the channel complex (FIG. 11B).
Figure 11B:
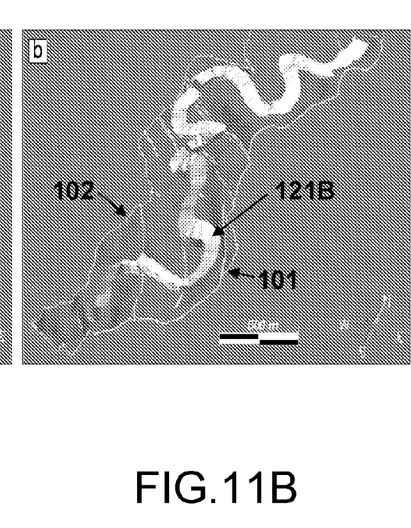

FIG. 11 allows the comparison to be made between an example of the last channel 121A obtained from seismic data (FIG. 11A) and a last channel 121B simulated from the morphology 101, 102 of the channel complex or fairway, according to the present embodiment. As FIG. 11 shows, the realism of simulated last channel 121B is striking.

Once the last channel has been reconstituted, the methodology corresponding to the first embodiment can be applied. One can then reconstitute the channels making up the complex.

Figure 12A:
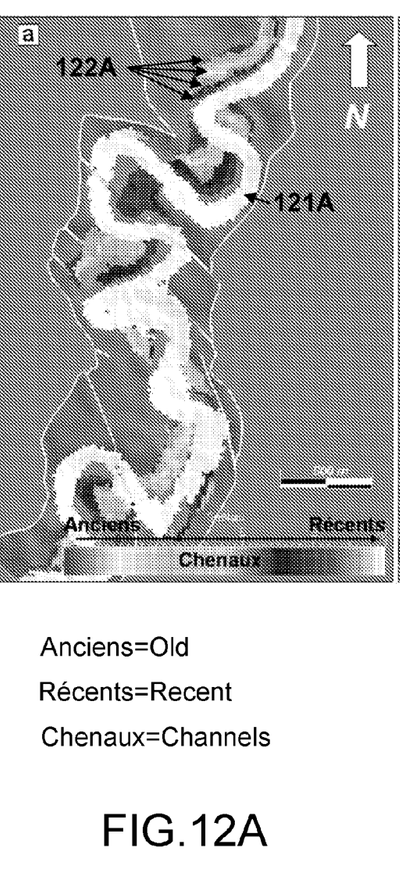
FIGS. 12A-12B allow comparison of channel maps interpreted starting from seismic data (FIG. 12A) and channels modeled starting from the modeled last channel in FIG. 10 (FIG. 12B).
Figure 12B:
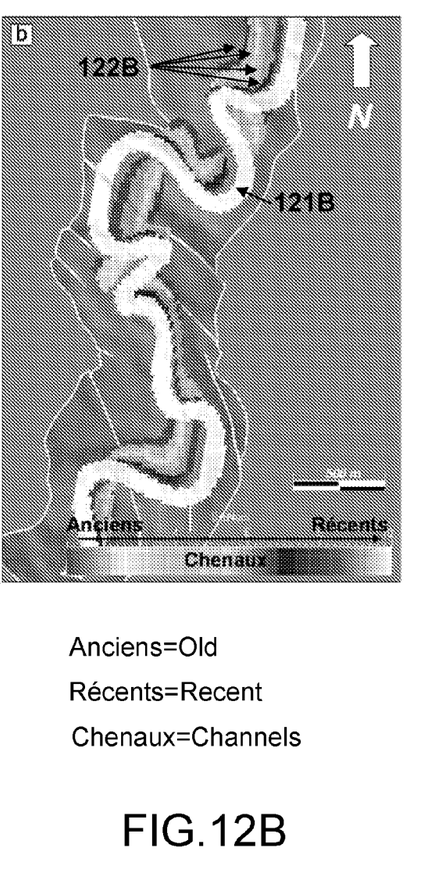

FIG. 12 makes it possible to compare maps for channels 122A interpreted from seismic data (FIG. 12A) with maps for intermediate channels 122B simulated using the first embodiment, from a last channel 121B simulated as discussed above (FIG. 12B). Contrary to the example associated with the previous embodiment, channels 121A and 121B are no longer identical. However, here again, the realism of channels 122B is striking, even though last channel 121B was simulated.

The method according to the invention can be implemented in a computer program and run on a computer. The computer program can be a program module, which in its turn can be incorporated into another program that is more general.

The resulting module offers the possibility of improved channel simulation, in particular channels with lateral migration, in turbidite reservoirs. Such a module makes it possible to overcome the lack of organization of channels when generated by geostatistical object simulations. This leads to optimum distribution of barriers inside reservoir models in a channel context. One direct impact of implementing the invention is a reduction in the cost of optimizing the trajectory of development drillings, and consequently better exploitation of oil traps in channel complexes. The method of the invention can be an integral part of a method for optimizing development well trajectories. Oil recovery can then be increased by up to 20 percent in some cases.

The invention is however not limited to the embodiments described above but may be the object of numerous other variations readily accessible to those skilled in the art.

Further, data pertaining to an intermediate channel may optionally be integrated into the simulation in order to constrain this intermediate channel in accordance with this data. In this case, one combines data pertaining to the final form of the complex, the said data pertaining to the intermediate channel and the rules for how the system evolves (on which the trajectories are based).

It should be noted that only the main novel aspects of the invention have been described in detail.

Further, although two embodiments have been discussed separately above, both embodiments are perfectly compatible. For example, a tool in the program module implementing the invention can propose to a user to simulate the last channel starting from characteristics of the complex.

Alternatively, this option can be applied by default, while remaining able to be parametered by the user. If the user refuses this option, the algorithm will run as in the first embodiment. If, on the contrary, the user does choose this option, the algorithm will run then in line with the second embodiment.

The invention claimed is:

1. A method for channel simulation, implemented by computer, comprising the steps of:
   interpreting data characteristic of a complex of channels for a last channel and for a modeled initial channel, wherein the last channel corresponds to a migration over time of the initial channel;
   determining, from this interpreted data, points on trajectories running from the last channel to the initial channel, wherein the trajectories correspond to an inverse of said migration; and
   simulating at least one intermediate channel running through these points, thereby modeling said migration.

2. The method according to claim 1, wherein the interpreted data is characteristic for respective axes of last and initial channels; and
   during the determining points, the points are determined on trajectories running from the axis of the last channel to the axis of the initial channel.

3. The method according to claim 2, wherein, during the determining step, at least one of the trajectories depends on a distance between a point on the axis of the last channel and a point on the axis of the initial channel.

4. The method according to claim 3, wherein the point on the last channel axis is a point characteristic of a B-spline type curve fitted to the axis of the last channel; and the point on the initial channel axis is a projection of this characteristic point onto the initial channel axis.

5. The method according to claim 4, wherein the projection of said characteristic point onto the initial channel axis is a perpendicular projection.

6. The method according to claim 3, wherein, during the determining, said at least one of the trajectories is a line joining the last channel axis and the initial channel axis, a curvature of which depends on said distance between the point on the last channel axis and the point on the initial channel axis.

7. The method according to claim 6, wherein the at least one of the trajectories is a semi-parabola of amplitude varying depending on said distance between the point on the last channel axis and the point on the initial channel axis.

8. The method according to claim 6, wherein:
the at least one of the trajectories is a straight line if the distance between the point on the last channel axis and the point on the initial channel axis is greater than a critical distance;
otherwise, the trajectory is a semi-parabola of amplitude varying depending on a distance between the point on the last channel axis and the point on the initial channel axis.

9. The method according to claim 8, wherein the critical distance is a distance calculated as a function of the interpreted data.

10. The method according to claim 8, wherein the critical distance is user-modifiable.

11. The method according to claim 2, comprising, prior to the interpreting:
reading data pertaining to a channel complex; and
calculating data characterizing the initial channel and/or the last channel from said data pertaining to the channel complex.

12. The method according to claim 11, wherein the data pertaining to the channel complex characterizes the margins of said complex, and during the calculating data, the initial channel axis and/or the last channel is determined as a function of the margins of said complex.

13. The method according to claim 12, wherein the data calculated during the calculating data characterizes the initial channel, and during the calculating data, the initial channel axis is the median line of the margins of said complex.

14. The method according to claim 12, wherein: the data calculated during the calculating data characterizes the last channel, and during the calculating data, the last channel axis is determined as a function of the curvature of the margins of said complex, at points characteristic of each one of said margins, and as a function of the curvature sign of the points characteristic of each one of these margins.

15. A computer program product for channel simulation, the program comprising routines for execution of:
interpreting data characteristic of a complex of channels for a last channel and for a modeled initial channel, wherein the last channel corresponds to a migration over time of the initial channel;
determining, from this interpreted data, points on trajectories running from the last channel to the initial channel, wherein the trajectories correspond to an inverse of said migration; and
simulating at least one intermediate channel running through these points, thereby modeling said migration, when said program is run in a computer.

16. A computer system comprising a memory storing a computer program for channel simulation, the program comprising routines for execution of:
interpreting characteristic data for a last channel and for a modeled initial channel;
determining, from this interpreted data, points on trajectories running from the last channel to the initial channel; and
simulating at least one intermediate channel running through these points,
when said program is run.

* * * * *